March 29, 1960

A. J. HIRST 2,930,563

RESILIENT MOUNTINGS

Filed July 13, 1954

INVENTOR
Archie John Hirst.
BY
Harness, Dickey & Pierce
ATTORNEYS

March 29, 1960 A. J. HIRST 2,930,563
RESILIENT MOUNTINGS
Filed July 13, 1954
5 Sheets-Sheet 2

INVENTOR.
Archie John Hirst.
BY Harness, Dickey & Pierce.
ATTORNEYS.

March 29, 1960  A. J. HIRST  2,930,563
RESILIENT MOUNTINGS
Filed July 13, 1954
5 Sheets-Sheet 3

INVENTOR
Archie John Hirst.
BY
Harness, Dickey & Pierce.
ATTORNEYS.

March 29, 1960

A. J. HIRST 2,930,563

RESILIENT MOUNTINGS

Filed July 13, 1954

INVENTOR
Archie John Hirst.
BY
Barnes, Dickey & Pierce
ATTORNEYS

March 29, 1960  A. J. HIRST  2,930,563
RESILIENT MOUNTINGS

Filed July 13, 1954  5 Sheets-Sheet 5

INVENTOR
Archie John Hirst
BY
Harness, Dickey & Pierce.
ATTORNEYS.

United States Patent Office 2,930,563
Patented Mar. 29, 1960

2,930,563
RESILIENT MOUNTINGS

Archie John Hirst, Leicester, England, assignor to Metalastik Limited, Leicester, England, a corporation of Great Britain Application July 13, 1954, Serial No. 443,102
8 Claims. (Cl. 248—204)

This invention relates to resilient suspension systems designed to carry a static load while absorbing transients. Such resilient suspension systems are widely used, see for example our prior Great Britain patent specification No. 621,638, in road and rail vehicles where the static load is the gravitational load of the coach or chassis and the transients include the shocks and rebounds due to irregularities in the track. Again, such systems are also used, see for example our prior Great Britain patent specification No. 612,702, for mounting a seat on a tractor or like vehicle, where the static load is the weight of the person on the seat, and the transients include engine vibrations. The transients to be absorbed by the system may have their origin either in the suspended part or in the base part; and their absorption prevents or reduces their being transmitted from the part in which they have their origin to the other part.

The following description relates to the accompanying drawings which show by way of example only several embodiments of the invention as applied to the suspension of a seat upon a vehicle such as a tractor.

Figure 1:
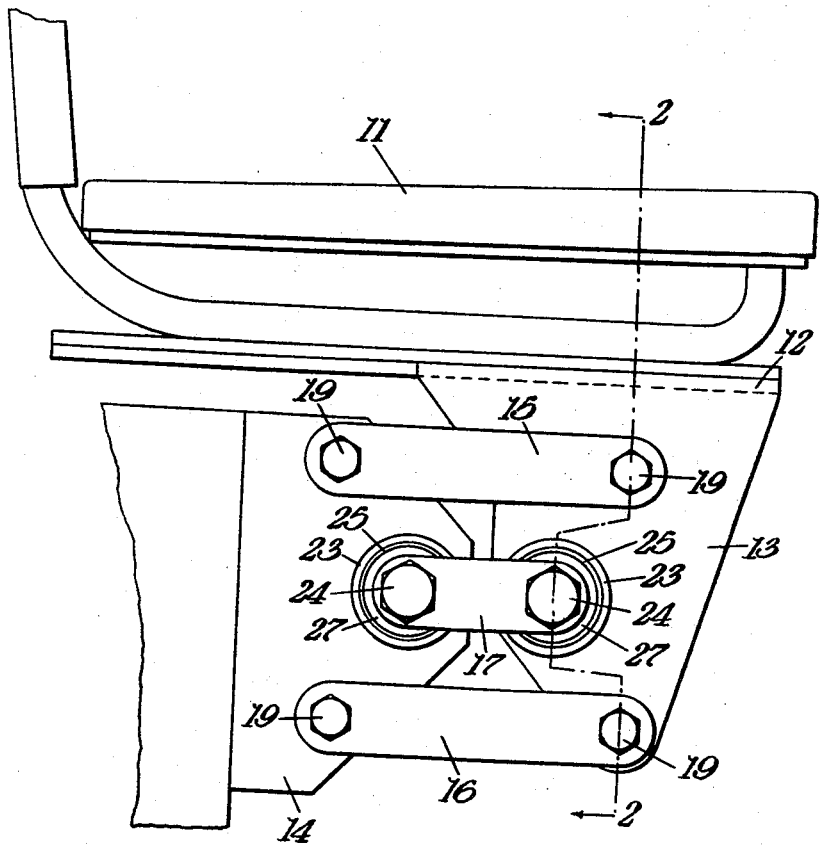
Figure 1 is a side view of a first embodiment of the invention.
Figure 2:
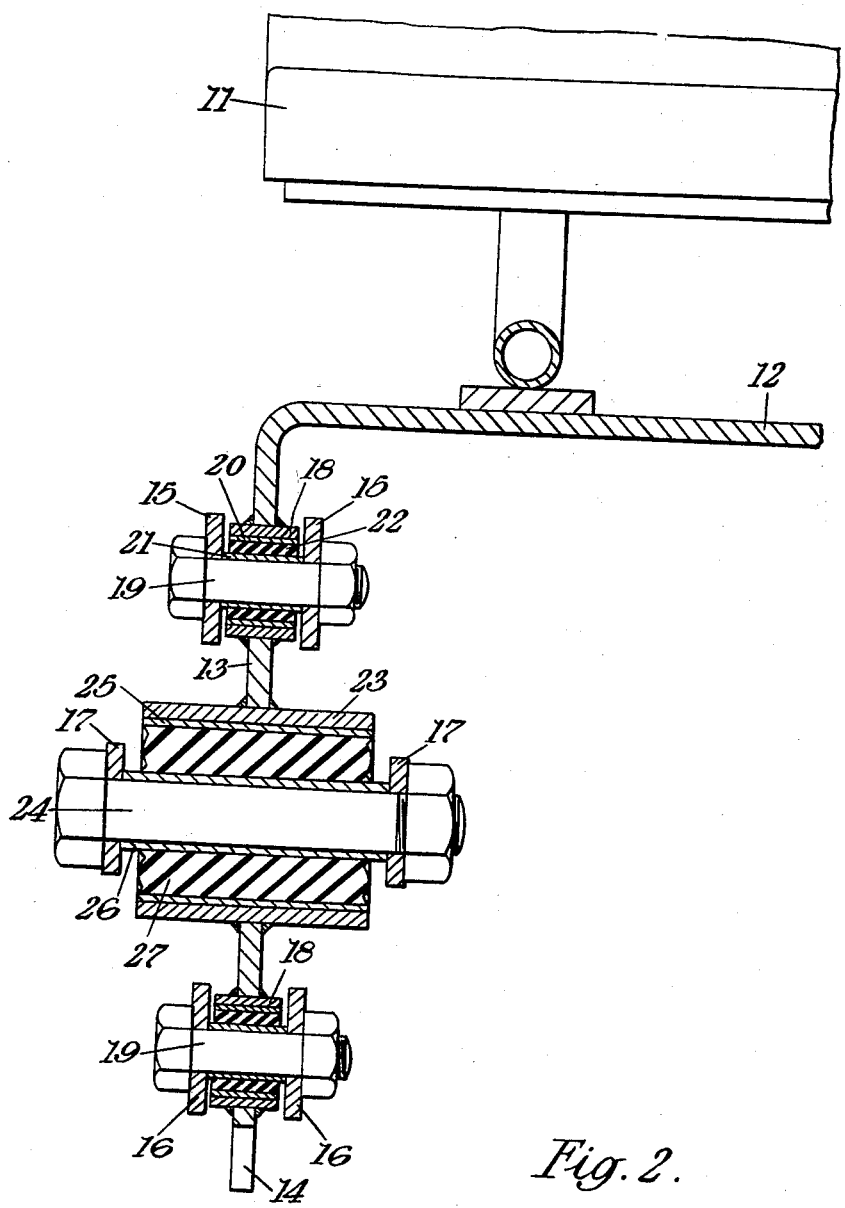
Figure 2 is a section on the line 2—2 of Figure 1.

In the embodiment of the invention shown in Figures 1 and 2, the seat 11 is fixedly mounted upon a U-shaped seat bracket 12 having side cheeks 13 extending downwardly. A U-shaped base bracket 14 secured to the vehicle has side cheeks lying in the same planes as those of the side cheeks 13 on the seat bracket, and to the rear of those cheeks. Between the two brackets 12 and 14 extend three links, namely a top link 15 and a bottom link 16 which have their pivot centres always at the corners of a parallelogram, and which constitute a single linkage hereinafter referred to as a guiding or control linkage; and an intermediate link 17, which has its two pivot centres more closely spaced than are those of the top and bottom links 15 and 16, and which constitutes a linkage hereinafter referred to as a suspension linkage.

All six pivots of these three links consist of precompressed rubber bushes such as are described for example in our prior Great Britain patent specification No. 581,464.

Thus, as shown more particularly in Figure 2, in order to provide for the pivots of the top and bottom links 15 and 16 metal sleeves 18 are welded into apertures in the cheeks of the brackets 12 and 14, while bolts 19 extend through the apertures between the elements of the link on each side of the cheek. A rubber bush consisting of an outer metal sleeve 20, an inner metal sleeve 21, and an intermediate annulus 22 of rubber in a state of radial compression, is located fixedly within the metal sleeve 18 which receives the bolt 19 and secured thereby in fixed relation to the link 17. Again the pivots of the intermediate link 17 are similarly provided for by a metal sleeve 23 welded in the cheek, a bolt 24 extending through the sleeve 23 between the elements of the link 17, and a rubber bush consisting of an outer metal sleeve 25, an inner metal sleeve 26, and an intermediate annulus 27 of rubber in compression. It will be seen that the rubber bushes at the ends of the intermediate link 17 are considerably stouter than those at the ends of the top and bottom links 15 and 16.

Figure 3:
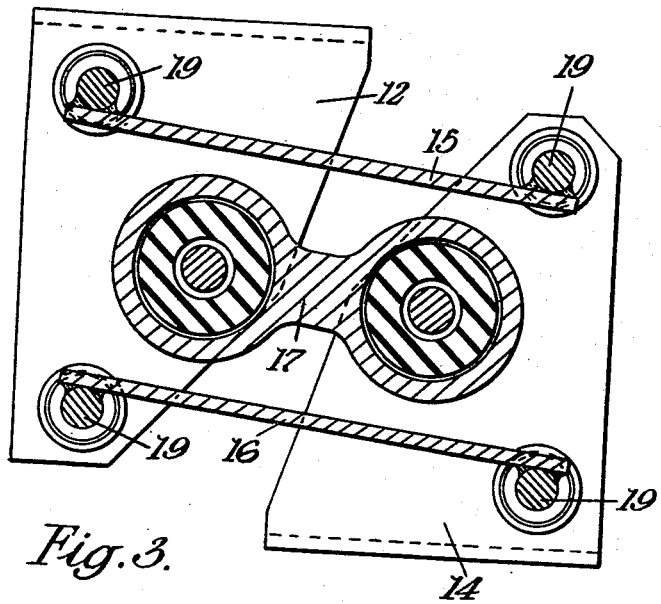
Figure 3 is a side section of a second embodiment on the line 3—3 of Figure 4.
Figure 4:
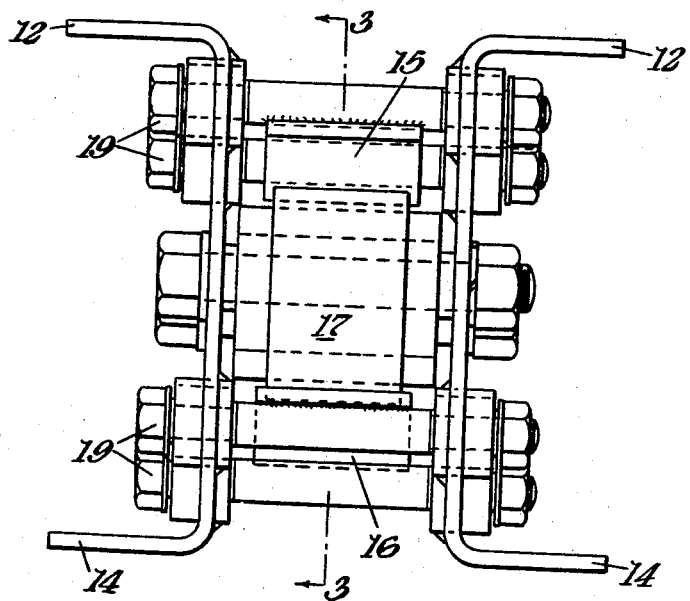
Figure 4 is an end view of this second embodiment.

In the second embodiment, that shown in Figures 3 and 4, there is not a single seat bracket extending as in the first embodiment across the whole width of the seat; instead there is a single suspension assembly underlying the middle of the seat. So far as is practicable, however, the same reference numerals are used for the parts of the several embodiments having the same function.

The two-piece seat bracket 12 is connected to the two-piece base bracket 14 by top and bottom links 15 and 16 forming the guiding or control linkage and by an intermediate link 17 forming the suspension linkage.

The rubber pivots for the top and bottom links are exactly as shown in and described with reference to Figures 1 and 2. The links 15 and 16 themselves, however, are disposed with their planes parallel to the planes containing the pivot axes, and not normal thereto as in Figures 1 and 2. Thus the link itself affords a certain resilience. With this disposition of the links, the fixing of the links to the pivot bolts 19 is effected by welding.

Similarly in the case of the intermediate link 17, the rubber pivots are as in the first embodiment; but the link itself consists of a loop-like or 8-shaped element.

Figure 5:
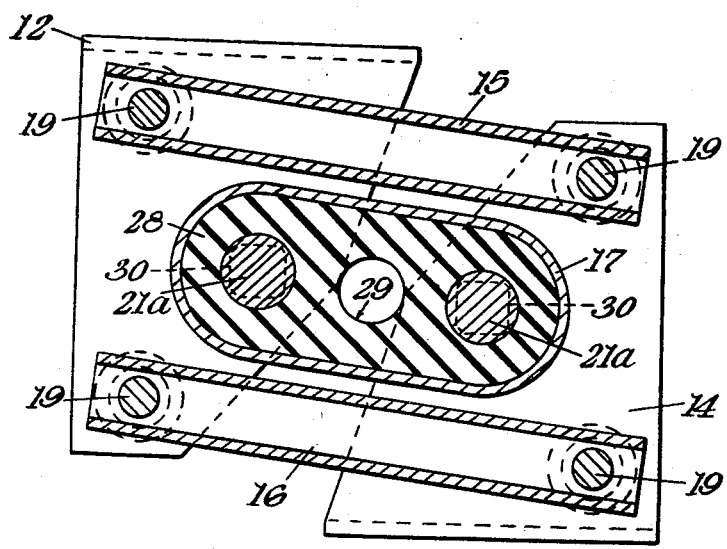
Figure 5 is a side section of a third embodiment, being a section on the line 5—5 of Figure 6.
Figure 6:
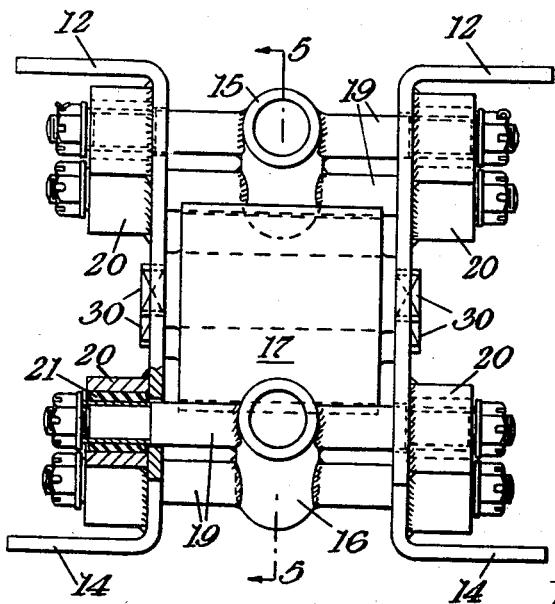
Figure 6 is an end view, partly in section on the line 6—6 of Figure 5 of this third embodiment.

In the third embodiment, shown in Figures 5 and 6, the top and bottom links 15 and 16 each consist of an H-shaped tubular element. The bolts 19 extend through the side members of the element and through the inner element 21 of a rubber bush. The outer element 20 of the bush is welded to the cheek of the respective bracket 12 or 14.

The intermediate link 17 is in the form of a drawn or formed flattened steel tube with part-cylindrical ends and substantially parallel median portions. The rubber filling 28 is moulded to occupy the interior of the tubular element 17 including the substantially parallel median portion, except for an aperture 29 for the relief of any tendency to tensional stress due to elongation of the rubber radial loading on deflection. The rubber 28 is placed under pre-compression by making the median portions of the metal element 17 slightly bulged or angular towards the exterior and forcing them into parallelism after the rubber has been moulded therein. The metal members 21a embedded in the rubber filling at the ends of the element consist of cylindrical or similar section pins having squared or equivalent ends 30 which project at the sides from the rubber and from the metal tubular element in order to enable them to be keyed against rotation relatively to the attachment brackets.

Figure 7:
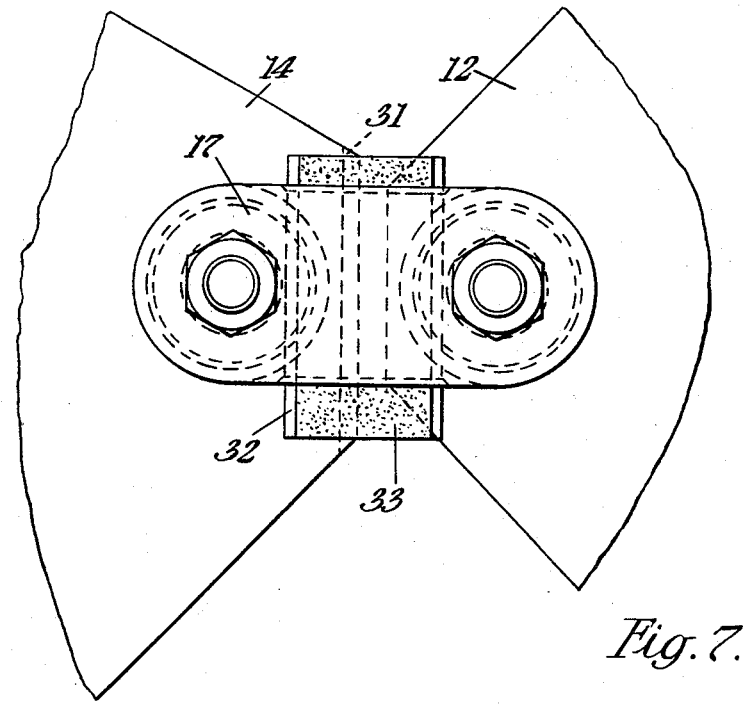
Figure 7 is an elevational view of a friction damping device which may be incorporated in any of the embodiments of the invention.
Figure 8:
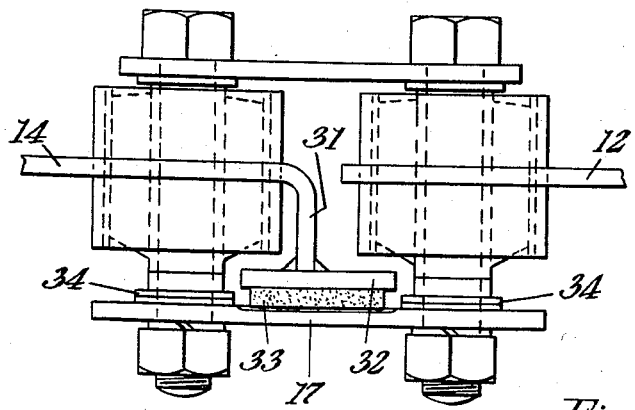
Figure 8 is a plan view of the device shown in Figure 7.

In Figures 7 and 8 is shown a feature of the invention which may be applied to any of the embodiments already illustrated and described, namely the provision of friction damping for the suspension. The chassis bracket 14 is shown having an extension 31 turned through a right-angle beyond the pivotal connection to the link 17 and having a flat plate 32 welded to its extremity T-fashion, i.e. so that the outer flat face of the plate 32 is parallel with and spaced a little from the intermediate surfaces of the link 17. On that space and attached to the plate 32 is a pad 33 of friction material such as bonded asbestos. The load on the friction material is maintained by the axial resilience of the bushes which are displaced in axial shear to keep the link in contact with the pad. The degree of pressure between that pad and the link surface is made adjustable by the provision of plain washers 34 at the link pivots. The friction pad 33 may alternatively be fixed to the link 17. The fixing may be accomplished by riveting, or by bonding with a synthetic resin adhesive.

It will be thus appreciated that in all embodiments of the invention there is a control or guiding linkage and a suspension linkage. The control linkage serves to prevent movement in the horizontal plane or at least to prevent horizontal movement in its own vertical plane; at the same time it largely determines the deflection path of the supported part relative to the base part; while it does not in any great measure carry the vertical load. The suspension linkage on the other hand is the one carrying the major part of the vertical load. The link or links forming the control linkage must be of different length from the link or links forming the suspension linkage; they must be so dimensioned and arranged that in the minimum stiffness position the links are either all parallel with one another or have a common point of intersection. The lengths and depositions here referred to are of course those determined by the centres of the respective end pivots.

The rubber annulus 22 of the suspension links and of the control links may be bonded to the sleeves 20, 21 and the sleeves may be secured to the links and to the brackets so that they are incapable of rotation whereby on deflection of the links by rising and falling of the seat the rubber bushes are loaded torsionally. Instead of bonding the annulus 22 may frictionally engage the sleeves 20, 21. The bushes may be pre-loaded torsionally during assembly so that the application of a static load reduces the pre-loading till in the neutral position the pre-loading is fully eliminated. Consequently rising and falling movements of the control links on each side of the neutral position will result in the rubber bushes of the control links being torsionally loaded in opposite directions. Again the rubber bushes of the suspension link may be loaded torsionally only when a static load is applied thereto so that in the neutral position there is a torsional force tending to raise the seat.

Under static load conditions the mounting may be arranged to be in the neutral position without radial load due to the differences in deflection paths of the control linkage and the suspension linkage. All the links though parallel in the neutral position are not horizontal, but upwardly inclined towards the ends for attachment to the supported part. Thus the control links are inclined to the direction of deflection in the neutral position and this has the effect of giving a slightly greater rate of increase of resistance to movement in the upward than the downward direction owing to the greater radial comprehensive loading of the pivotal connection for deflection in the upward direction.

The rubber elements may be pre-compressed radially as by contracting the outer metal member or by expanding the inner metal member.

In the embodiment of the invention shown in Figures 5 and 6, it may be desirable to arrange the suspension link so that the distance between the axes of its pins is shorter than the key apertures in the brackets so that when the link is assembled the said distance is increased and there will be radial compression on the rubber at the ends of the link even when the parallel links are in their neutral position corresponding to a static light load such as the weight of a light driver with the vehicle at rest. This will ensure that the rubber at the end of the link is always under compressive stress as with the pre-compressed bushes described in the other embodiments.

In all embodiments instead of assembling the suspension link under initial tension it may be arranged so that the distance between the axes of its pins is longer than the key apertures in the brackets to put it under initial compression in the neutral position. By this means the stiffness of the suspension can be reduced over a limited range for small deflections about the neutral position but the greatly increased resistance to large deflections be retained.

Owing to the effect of the increasing compressive loading of the rubber of the pivotal connections in all embodiments of the invention an S-shaped load/deflection curve and an approximation to constant periodicity can be obtained. Especially in the third embodiment using the rubber loop type of suspension link this periodicity may be very low.

It may sometimes be found that the rising characteristic of a suspension system in accordance with this invention does not limit movement sufficiently under shock loads. Consequently it may in such cases be desirable to incorporate some form of damping device which makes use of the movement of the links for its operation.

It will be understood that the term "rubber" as used in this specification includes any resilient material, whether derived from natural or artificial rubber, having the necessary physical characteristics. The rubber may or may not be bonded to its associated metal parts.

I claim:

1. A resilient suspension system for suspending a supported part in relation to a base part comprising a first linkage pivotally connected between the parts and including at least two links, and means connecting said links at one end to one of said parts for pivotal movement relative thereto about spaced parallel axes and connecting the opposite ends of said links to the other of said parts for pivotal movement relative thereto about other spaced parallel axes so that said first linkage substantially determines the possible relative movement of the parts, a second linkage also pivotally connected between the parts and including a link of substantially different effective length than said two links and means connecting said last named link at one end to said one of said parts for pivotal movement relative thereto about an axis parallel to and spaced from each of said first named parallel axes and connecting said last named link at the other end to said other of said parts for pivotal movement relative thereto about an axis parallel to and spaced from each of said other spaced parallel axes, said linkages suspending said supported part on said base part for displacement from a neutral position in which all of said links are substantially parallel, and rubber bushing means disposed at the pivotal connections of said last named link to said parts and radially compressible to accommodate the difference in deflection paths of the two linkages arising from their differently spaced axes and to afford increasing resistance to displacement of said supported part from said neutral position.

2. A resilient suspension system as claimed in claim 1, wherein said suspension link is under tension when the system is in the neutral position.

3. A resilient suspension system as claimed in claim 1, wherein said suspension link is under initial compression when said system is in the neutral position.

4. A resilient suspension system as claimed in claim 1, including friction damping means.

5. A resilient suspension system for suspending a supported part in relation to a base part comprising a control linkage having two parallel links of equal length, means pivotally connecting corresponding ends of said parallel links to one of said parts for pivotal movement about spaced parallel axes and connecting the opposite ends of said parallel links to the other of said parts for pivotal movement about other spaced parallel axes so that said control linkage provides a parallelogram linkage connection determining the path of relative movement between said parts, a suspension link disposed between said links of the control linkage and of substantially shorter length than said link of said control linkage, means connecting one end of said suspension link to said one of said parts for pivotal movement about an axis parallel to and spaced from said first named spaced parallel axes and connecting the other end of said suspension link to said other of said parts for pivotal movement about an axis parallel to and spaced from said other spaced parallel axes, said means including rubber bushing means at said pivotal connections of said suspension link to said parts which are adapted by compression of said rubber bushing means to support the static load and to take up transient loads, said linkage and said suspension link suspending said supported part for displacement from a neutral position in which all of the links are substantially parallel.

6. A resilient suspension system for suspending a supported part in relation to a base part comprising a control linkage connecting said parts and determining the path of relative movement between said parts, said control linkage including at least two links, means connecting said links at one end to one of said parts for pivotal movement relative thereto about spaced parallel axes and connecting said links at their opposite ends to the other of said parts for pivotal movement relative thereto about other spaced parallel axes, said control linkage also including rubber bushing means at the pivotal connections of said two links to said parts, a suspension linkage connecting said parts and including a link of different effective length than said two links, means connecting said last named link at one end to one of said parts for pivotal movement relative thereto about an axis spaced from and parallel to said first named parallel axes and connecting said last named link at its other end to the other of said parts for pivotal movement relative thereto about an axis spaced from and parallel to said other spaced parallel axes, said suspension linkage including other rubber bushing means at the pivotal connections of said last named link to said parts adapted to be compressed to support a static load and to at least partially take up transient loads, and means securing each of said bushing means to one of said links and to one of said parts for torsion loading of said bushing means, said control linkage and said suspension linkage being so constructed and arranged as to suspend said supported part on said base part for displacement from a neutral position in which all of said links are substantially parallel and in which said rubber bushing means of said control linkage has a substantially zero torsional stress.

7. A resilient suspension system for suspending a supported part in relation to a base part comprising a control linkage connecting said parts and substantially determining the path of relative movement between said parts, said control linkage including at least two links, means connecting said links at one end to one of said parts for pivotal movement relative thereto about spaced parallel axes and connecting said links at their opposite ends to the other of said parts for pivotal movement relative thereto about other spaced parallel axes, a suspension link of substantially shorter length than said two links and comprising a looplike metal element and a rubber member received in and encircled by said looplike metal element and two spaced metal attachment elements imbedded in said rubber link, means connecting one end of said suspension link to said one of said parts for pivotal movement relative thereto about an axis parallel to and spaced from said first named parallel axes and connecting the other end of said suspension link to the other of said parts for pivotal movement relative thereto about an axis parallel to and spaced from said other parallel axes, said last named means including means connecting one of said attachment elements to one of said parts for movement therewith and means connecting the other of said attachment elements to the other of said parts for movement therewith, said control linkage and said suspension link being constructed and arranged to suspend said supported part on said base part for displacement from a neutral position in which all of said links are substantially parallel.

8. A resilient suspension system as defined in claim 7 wherein said control linkage and said suspension link are so constructed and arranged that said attachment elements compress the rubber of said rubber member at the ends thereof against said looplike metal element when said supported part is in said neutral position.

References Cited in the file of this patent

UNITED STATES PATENTS

| | | |
|---|---|---|
| 2,122,839 | Guy | July 5, 1938 |
| 2,246,847 | Herreshoff | June 24, 1941 |
| 2,457,340 | Berry | Dec. 28, 1948 |
| 2,509,769 | Hirst | May 30, 1950 |
| 2,648,510 | Henshaw | Aug. 11, 1953 |
| 2,652,880 | Gunderson | Sept. 22, 1953 |
| 2,667,209 | Gunderson | Jan. 26, 1954 |

FOREIGN PATENTS

| | | |
|---|---|---|
| 982,427 | France | Jan. 31, 1951 |